(12) United States Patent
Yandrasits et al.

(10) Patent No.: US 7,435,498 B2
(45) Date of Patent: *Oct. 14, 2008

(54) POLYMER ELECTROLYTE MEMBRANES CROSSLINKED BY NITRILE TRIMERIZATION

(75) Inventors: Michael A. Yandrasits, Hastings, MN (US); Steven J. Hamrock, Stillwater, MN (US); Werner M. Grootaert, Oakdale, MN (US); Miguel A. Guerra, Woodbury, MN (US); Naiyong Jing, Woodbury, MN (US)

(73) Assignee: 3M Innovative Properties Company, Saint Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 11/419,515

(22) Filed: May 22, 2006

(65) Prior Publication Data

US 2006/0205829 A1    Sep. 14, 2006

Related U.S. Application Data

(62) Division of application No. 10/712,589, filed on Nov. 13, 2003, now Pat. No. 7,074,841.

(51) Int. Cl.
*B01J 39/16* (2006.01)
*B01J 39/18* (2006.01)
*C08F 12/02* (2006.01)
*C08F 12/20* (2006.01)
*C08F 14/18* (2006.01)
*H01M 8/10* (2006.01)

(52) U.S. Cl. .................. 429/33; 429/30; 429/12; 521/27; 521/30; 521/31; 521/38; 521/32; 521/33; 528/401; 526/242; 526/243; 526/248; 526/249; 252/182.1

(58) Field of Classification Search ............ 522/1, 522/2, 150, 155, 156, 184, 185, 186, 187, 522/188, 189, 173; 429/12, 30, 33; 521/27, 521/30, 31, 38, 32, 33; 528/401; 526/242, 526/243, 248, 249; 252/182.1

See application file for complete search history.

(56) References Cited

U.S. PATENT DOCUMENTS

| | | | |
|---|---|---|---|
| 3,282,875 A | 11/1966 | Connolly et al. | |
| 3,635,926 A | 1/1972 | Gresham et al. | |
| 3,784,399 A | 1/1974 | Grot | |
| 3,853,828 A | 12/1974 | Wall et al. | |
| 4,000,356 A | 12/1976 | Weisgerber et al. | |
| 4,073,752 A | 2/1978 | Ramp | |
| 4,169,023 A | 9/1979 | Sata et al. | |
| 4,214,060 A | 7/1980 | Apotheker et al. | |
| 4,218,542 A | 8/1980 | Ukihashi et al. | |
| 4,230,549 A | 10/1980 | D'Agostino et al. | |
| 4,242,498 A | 12/1980 | Rosser et al. | |
| 4,268,650 A | 5/1981 | Rose | |
| 4,281,092 A | 7/1981 | Breazeale | |
| 4,330,654 A | 5/1982 | Ezzell et al. | |
| 4,334,082 A | 6/1982 | Resnick | |
| 4,391,844 A | 7/1983 | Baczek et al. | |
| 4,414,159 A | 11/1983 | Resnick | |
| 4,440,917 A | 4/1984 | Resnick | |
| 4,454,247 A | 6/1984 | Resnick | |
| 4,470,889 A | 9/1984 | Ezzell et al. | |
| 4,508,603 A | 4/1985 | Ukihashi et al. | |
| 4,602,045 A | 7/1986 | Markus et al. | |
| 4,686,024 A | 8/1987 | Scherer, Jr. et al. | |
| 4,734,474 A | 3/1988 | Hamada et al. | |
| 4,743,419 A | 5/1988 | Bierschenk | |
| 4,755,567 A | 7/1988 | Bierschenk et al. | |
| 4,981,932 A | 1/1991 | Blaise et al. | |
| 5,260,351 A | 11/1993 | Logothetis | |
| 5,264,508 A | 11/1993 | Ishibe et al. | |
| 5,330,626 A | 7/1994 | Banerjee | |
| 5,466,930 A | 11/1995 | Schlenoff | |
| 5,527,861 A | 6/1996 | Logothetis | |

(Continued)

FOREIGN PATENT DOCUMENTS

DE        26 24 203        12/1976

(Continued)

OTHER PUBLICATIONS

Kirk-Othmer, *Encyclopedia of Chemical Technology*, 3d ed., vol. 10, (1980), pp. 840-855.

(Continued)

*Primary Examiner*—Sanza L McClendon
(74) *Attorney, Agent, or Firm*—Philip Y. Dahl

(57) ABSTRACT

A method is provided for making a crosslinked polymer electrolyte, typically in the form of a membrane for use as a polymer electrolyte membrane in an electrolytic cell such as a fuel cell, by trimerization of nitrile groups contained on groups pendant from the polymer. The resulting polymer electrolyte membrane comprises a highly fluorinated polymer comprising: a perfluorinated backbone, first pendent groups which comprise sulfonic acid groups, and crosslinks comprising trivalent groups according to the formula:

(I)

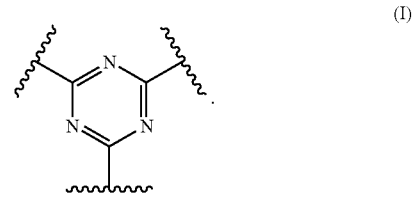

The first pendent groups are typically according to the formula: $-R^1-SO_3H$, where $R^1$ is a branched or unbranched perfluoroalkyl or perfluoroether group comprising 1-15 carbon atoms and 0-4 oxygen atoms, most typically $-O-CF_2-CF_2-CF_2-CF_2-SO_3H$ or $-O-CF_2-CF(CF_3)-O-CF_2-CF_2-SO_3H$.

21 Claims, No Drawings

U.S. PATENT DOCUMENTS

| | | | |
|---|---|---|---|
| 5,608,022 | A | 3/1997 | Nakayama et al. |
| 5,693,748 | A | 12/1997 | Ikeda et al. |
| 5,795,496 | A | 8/1998 | Yen et al. |
| 5,798,417 | A | 8/1998 | Howard, Jr. |
| 5,804,650 | A | 9/1998 | Tsuda et al. |
| 5,852,148 | A | 12/1998 | Behr et al. |
| 5,986,012 | A | 11/1999 | Legare et al. |
| 6,011,074 | A | 1/2000 | Sorenson et al. |
| 6,090,895 | A | 7/2000 | Mao et al. |
| 6,224,994 | B1 | 5/2001 | Asukabe et al. |
| 6,225,368 | B1 | 5/2001 | D'Agostino et al. |
| 6,242,123 | B1 | 6/2001 | Nezu et al. |
| 6,248,469 | B1 | 6/2001 | Formato et al. |
| 6,254,978 | B1 | 7/2001 | Bahar et al. |
| 6,255,370 | B1 | 7/2001 | Vizcaino et al. |
| RE37,307 | E | 8/2001 | Bahar et al. |
| 6,274,677 | B1 | 8/2001 | Tatemoto |
| 6,277,512 | B1 | 8/2001 | Hamrock et al. |
| 6,355,370 | B2 | 3/2002 | Katoh et al. |
| RE37,656 | E | 4/2002 | Bahar et al. |
| 6,365,769 | B1 | 4/2002 | Behr et al. |
| 6,380,337 | B2 | 4/2002 | Abe et al. |
| 6,387,964 | B1 | 5/2002 | D'Agostino et al. |
| 6,423,784 | B1 | 7/2002 | Hamrock et al. |
| 6,426,397 | B1 | 7/2002 | Armand et al. |
| 6,462,228 | B1 | 10/2002 | Dams |
| 6,498,216 | B1 | 12/2002 | Cheng |
| 6,503,378 | B1 | 1/2003 | Fisher |
| 6,552,135 | B2 | 4/2003 | Schnurnberger et al. |
| 6,624,328 | B1 | 9/2003 | Guerra |
| 6,649,703 | B2 | 11/2003 | Michot et al. |
| 6,667,377 | B2 | 12/2003 | Feiring et al. |
| 6,670,424 | B1 | 12/2003 | Michot et al. |
| 6,872,781 | B2 | 3/2005 | Hedhli et al. |
| 2002/0014405 | A1 | 2/2002 | Arcella et al. |
| 2002/0040106 | A1 | 4/2002 | Wlassics et al. |
| 2003/0032739 | A1 | 2/2003 | Kerres et al. |
| 2003/0092940 | A1 | 5/2003 | Hamrock |
| 2003/0181572 | A1 | 9/2003 | Tan et al. |
| 2003/0181615 | A1 | 9/2003 | Ameduri et al. |
| 2003/0208014 | A1 | 11/2003 | Kerres et al. |
| 2004/0121210 | A1 | 6/2004 | Hamrock et al. |
| 2004/0241518 | A1 | 12/2004 | Yang |
| 2005/0096442 | A1 | 5/2005 | Thaler et al. |
| 2005/0107488 | A1 | 5/2005 | Yandrasits et al. |
| 2005/0107489 | A1 | 5/2005 | Yandrasits et al. |
| 2005/0107490 | A1 | 5/2005 | Yandrasits et al. |
| 2005/0107532 | A1 | 5/2005 | Guerra et al. |
| 2005/0113528 | A1 | 5/2005 | Jing et al. |
| 2005/0131096 | A1 | 6/2005 | Jing et al. |
| 2005/0131097 | A1 | 6/2005 | Jing et al. |
| 2005/0137351 | A1 | 6/2005 | Guerra |

FOREIGN PATENT DOCUMENTS

| | | | |
|---|---|---|---|
| DE | 26 38 791 | | 3/1977 |
| DE | 100 21 104 | A1 | 11/2001 |
| EP | 0 048 964 | A2 | 4/1982 |
| EP | 0 407 937 | A1 | 1/1991 |
| EP | 0 422 231 | B1 | 12/1995 |
| EP | 1 085 038 | A1 | 3/2001 |
| EP | 1 091 435 | A1 | 4/2001 |
| EP | 1 179 548 | A1 | 2/2002 |
| EP | 1 238 999 | A1 | 9/2002 |
| EP | 1 359 142 | A1 | 11/2003 |
| FR | 2 387 260 | | 12/1976 |
| GB | 1184321 | | 3/1970 |
| JP | 53-29291 | | 3/1978 |
| JP | 53-97988 | | 8/1978 |
| JP | 53-134088 | | 11/1978 |
| JP | 54-52690 | | 4/1979 |
| JP | 56-72002 | | 6/1981 |
| JP | SHO 60-250009 | | 12/1985 |
| JP | SHO 62-288617 | | 12/1987 |
| JP | 64-3140 | | 1/1989 |
| JP | 5-314960 | | 11/1993 |
| JP | 8-239494 | | 9/1996 |
| JP | 2000-119420 | | 4/2000 |
| JP | 2000-268834 | | 9/2000 |
| JP | 2001-29800 | | 2/2001 |
| JP | 2001-176524 | | 6/2001 |
| JP | 2001-354641 | * | 12/2001 |
| JP | 2002-003466 | * | 1/2002 |
| JP | 2002-313364 | | 10/2002 |
| WO | WO 94/03503 | | 2/1994 |
| WO | WO 97/17381 | | 5/1997 |
| WO | WO 99/38897 | | 8/1999 |
| WO | WO 00/52060 | | 9/2000 |
| WO | WO 01/27167 | A1 | 4/2001 |
| WO | WO 01/87992 | A2 | 11/2001 |
| WO | WO 01/96268 | A2 | 12/2001 |
| WO | WI 02/50142 | A1 | 6/2002 |
| WO | WO 02/062749 | A1 | 8/2002 |
| WO | WO 02/087001 | A2 | 10/2002 |
| WO | WO 02/103834 | A1 | 12/2002 |
| WO | WO 03/004463 | A1 | 1/2003 |
| WO | WO 03/022892 | A2 | 3/2003 |

OTHER PUBLICATIONS

Gab-Jin Hwang et al.; "Preparation Of Cation Exchange Membrane As A Separator For The All-Vanadium Redox Flow Battery", Journal of Membrane Science, Elsevier Scientific Publ. Company, Amsterdam, NL, vol. 120, No. 1, Oct. 30, 1996, pp. 55-67.

* cited by examiner

POLYMER ELECTROLYTE MEMBRANES CROSSLINKED BY NITRILE TRIMERIZATION

CROSS REFERENCE TO RELATED APPLICATIONS

This application is a divisional of U.S. Ser. No. 10/712,589, filed Nov. 13, 2003, now U.S. Pat. No. 7,074,841 now allowed, the disclosure of which is herein incorporated by reference.

FIELD OF THE INVENTION

This invention relates to a method of making a crosslinked polymer electrolyte, typically in the form of a membrane for use as a polymer electrolyte membrane in an electrolytic cell such as a fuel cell, by trimerization of nitrile groups contained on groups pendant from the polymer.

BACKGROUND OF THE INVENTION

International Patent Application Publication No. WO 02/50142 A1 purportedly discloses fluorosulphonated nitrile crosslinkable elastomers based on vinylidene fluoride with low Tg.

U.S. Pat. No. 5,260,351 purportedly discloses perfluoroelastomers cured by radiation in the absence of curing agents. The reference purportedly relates to curing of fully fluorinated polymers, such as those prepared from tetrafluoroethylene, a perfluoroalkyl perfluorovinyl ether, and cure site or crosslinking units providing at least one of nitrile, perfluorophenyl, bromine or iodine in the resulting terpolymer.

U.S. Pat. No. 5,527,861 purportedly discloses nitrile containing perfluoroelastomers cured by a combination of a peroxide, a coagent, and a catalyst which causes crosslinks to form using the nitrile groups.

U.S. Pat. Nos. 4,334,082, 4,414,159, 4,440,917, and 4,454,247 purportedly disclose an ion exchange membrane for use in a chlor-alkali electrolysis cell formed from a copolymer of a vinyl ether monomer of the formula:

$$Y_2CFO(CF(CF_3)CF_2O)_nCF{=}CF_2$$

where Y is selected from the group consisting of $CF_2CN$, $CF_2CO_2R$, $CF_2CO_2H$, $CF_2CO_2M$, $CF_2CONH_2$ and $CF_2CONR$; a perfluorinated comonomer selected from tetrafluoroethylene, hexafluoropropylene, and perfluoroalkylvinyl ether; and $$CF_2{=}CF(OCF_2CF(CF_3))_nOCF_2CF_2SO_2F$$

where n is 1 or 2. (U.S. Pat. No. 4,454,247 at claim 1). These references purportedly disclose a method of curing fluoroelastomers by trimerization of nitriles to form triazine rings. (U.S. Pat. No. 4,454,247 at col. 10, lns. 60-68).

SUMMARY OF THE INVENTION

Briefly, the present invention provides a polymer electrolyte membrane comprising a highly fluorinated polymer comprising: a perfluorinated backbone, first pendent groups which comprise sulfonic acid groups, and crosslinks comprising trivalent groups according to the formula:

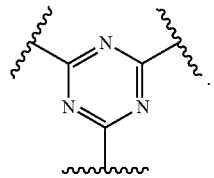

The first pendent groups are typically according to the formula: $-R^1-SO_3H$, where $R^1$ is a branched or unbranched perfluoroalkyl or perfluoroether group comprising 1-15 carbon atoms and 0-4 oxygen atoms, most typically $-O-CF_2-CF_2-CF_2-CF_2-SO_3H$ or $-O-CF_2-CF(CF_3)-O-CF_2-CF_2-SO_3H$.

In another aspect, the present invention provides a method of making a polymer electrolyte membrane comprising the steps of: a) providing a highly fluorinated polymer comprising: a perfluorinated backbone, first pendent groups which comprise sulfonyl halide groups, and second pendent groups which comprise nitrile groups; b) forming the fluoropolymer into a membrane; c) forming crosslinks by trimerization of the nitrile groups; and d) converting the sulfonyl halide groups to sulfonic acid groups. The second pendent groups are typically according to the formula: $-C{\equiv}N$ or $-R^{11}-C{\equiv}N$, where $R^{11}$ is a branched or unbranched perfluoroalkyl or perfluoroether group comprising 1-15 carbon atoms and 0-4 oxygen atoms. The first pendent groups typically according to the formula: $-R^1-SO_2X$, where X is a halogen and where $R^1$ is a branched or unbranched perfluoroalkyl or perfluoroether group comprising 1-15 carbon atoms and 0-4 oxygen atoms, most typically $-O-CF_2-CF_2-CF_2-CF_2-SO_2X$ or $-O-CF_2-CF(CF_3)-O-CF_2-CF_2-SO_2X$.

In another aspect, the present invention provides crosslinked polymers made according to any of the methods of the present invention.

In this application:

"equivalent weight" (EW) of a polymer means the weight of polymer which will neutralize one equivalent of base;

"hydration product" (HP) of a polymer means the number of equivalents (moles) of water absorbed by a membrane per equivalent of sulfonic acid groups present in the membrane multiplied by the equivalent weight of the polymer; and "highly fluorinated" means containing fluorine in an amount of 40 wt % or more, typically 50 wt % or more and more typically 60 wt % or more.

DETAILED DESCRIPTION

The present invention provides a crosslinked polymer electrolyte membrane. The membrane is derived from a polymer comprising: a highly fluorinated backbone, first pendent groups which include a group according to the formula $-SO_2X$, where X is a halogen and second pendent groups which include a nitrile group ($-C{\equiv}N$) which may be trimerized to form crosslinks comprising trivalent groups according to the formula:

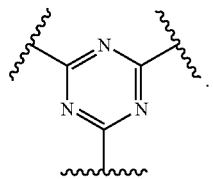

(I)

Such crosslinked polymer electrolyte membranes (PEM's) may be used in electrolytic cells such as fuel cells.

PEM's manufactured from the crosslinked polymer according to the present invention may be used in the fabrication of membrane electrode assemblies (MEA's) for use in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Gas diffusion layers (GDL's) facilitate gas transport to and from the anode and cathode electrode materials and conduct electrical current. The GDL may also be called a fluid transport layer (FTL) or a diffuser/current collector (DCC). The anode and cathode electrode layers may be applied to GDL's in the form of a catalyst ink, and the resulting coated GDL's sandwiched with a PEM to form a five-layer MEA. Alternately, the anode and cathode electrode layers may be applied to opposite sides of the PEM in the form of a catalyst ink, and the resulting catalyst-coated membrane (CCM) sandwiched with two GDL's to form a five-layer MEA. The five layers of a five-layer MEA are, in order: anode GDL, anode electrode layer, PEM, cathode electrode layer, and cathode GDL. In a typical PEM fuel cell, protons are formed at the anode via hydrogen oxidation and transported across the PEM to the cathode to react with oxygen, causing electrical current to flow in an external circuit connecting the electrodes. The PEM forms a durable, non-porous, electrically non-conductive mechanical barrier between the reactant gases, yet it also passes $H^+$ ions readily.

The polymer to be crosslinked comprises a backbone, which may be branched or unbranched but is typically unbranched. The backbone is highly fluorinated and more typically perfluorinated. The backbone may comprise units derived from tetrafluoroethylene (TFE), i.e., typically —$CF_2$—$CF_2$— units, and units derived from co-monomers, typically including at least one according to the formula $CF_2$=CY—R where Y is typically F but may also be $CF_3$, and where R is a first pendant group which includes a group according to the formula —$SO_2X$ which is a sulfonyl halide. X is most typically F. In an alternative embodiment, first side groups R may be added to the backbone by grafting. Typically, first side groups R are highly fluorinated and more typically perfluorinated. R may be aromatic or non-aromatic. Typically, R is —$R^1$—$SO_2X$, where $R^1$ is a branched or unbranched perfluoroalkyl or perfluoroether group comprising 1-15 carbon atoms and 0-4 oxygen atoms. $R^1$ is typically —O—$R^2$—wherein $R^2$ is a branched or unbranched perfluoroalkyl or perfluoroether group comprising 1-15 carbon atoms and 0-4 oxygen atoms. $R^1$ is more typically —O—$R^3$— wherein $R^3$ is a perfluoroalkyl group comprising 1-15 carbon atoms. Examples of $R^1$ include:

$(CF_2)_n$— where n is 1, 2, 3, 4, 5, 6, 7, 8, 9, 10, 11, 12, 13, 14 or 15

(—$CF_2CF(CF_3)$—)$_n$ where n is 1, 2, 3, 4, or 5

(—$CF(CF_3)CF_2$—)$_n$ where n is 1, 2, 3, 4, or 5 (—$CF_2CF(CF_3)$—)$_n$—$CF_2$— where n is 1, 2, 3 or 4

(—O—$CF_2CF_2$—)$_n$ where n is 1, 2, 3, 4, 5, 6 or 7

(—O—$CF_2CF_2CF_2$—)$_n$ where n is 1, 2, 3, 4, or 5

(—O—$CF_2CF_2CF_2CF_2$—)$_n$ where n is 1, 2 or 3

(—O—$CF_2CF(CF_3)$—)$_n$ where n is 1, 2, 3, 4, or 5

(—O—$CF_2CF(CF_2CF_3)$—)$_n$ where n is 1, 2 or 3

(—O—$CF(CF_3)CF_2$—)$_n$ where n is 1, 2, 3, 4 or 5

(—O—$CF(CF_2CF_3)CF_2$—)$_n$ where n is 1, 2 or 3

(—O—$CF_2CF(CF_3)$—)$_n$—O—$CF_2CF_2$— where n is 1, 2, 3 or 4

(—O—$CF_2CF(CF_2CF_3)$—)$_n$—O—$CF_2CF_2$— where n is 1, 2 or 3

(—O—$CF(CF_3)CF_2$—)$_n$—O—$CF_2CF_2$— where n is 1, 2, 3 or 4

(—O—$CF(CF_2CF_3)CF_2$—)$_n$—O—$CF_2CF_2$— where n is 1, 2 or 3

—O—$(CF_2)_n$— where n is 1, 2, 3, 4, 5, 6, 7, 8, 9, 10, 11, 12, 13 or 14

R is typically —O—$CF_2CF_2CF_2CF_2$—$SO_2X$ or —O—$CF_2$—$CF(CF_3)$—O—$CF_2$—$CF_2$—$SO_2X$ and most typically —O—$CF_2CF_2CF_2CF_2$—$SO_2X$. The —$SO_2X$ group is most typically —$SO_2F$ during polymerization, i.e., X is F. The —$SO_2X$ group is typically converted to —$SO_3H$ at some point prior to use of the fluoropolymer as an polymer electrolyte.

The fluoromonomer providing first side group R may be synthesized by any suitable means, including methods disclosed in U.S. Pat. No. 6,624,328.

In addition, the fluoropolymer includes second pendant groups Q containing a —C≡N group. The second pendant group may be derived from a co-monomer according to the formula $CF_2$=CY-Q where Y is typically F but may also be $CF_3$, and where Q is a second pendent group which includes a group according to the formula —C≡N. In an alternative embodiment, second pendant groups Q may be added to the backbone by grafting. Typically, second pendant groups Q are highly fluorinated and more typically perfluorinated, other than at the bromine position. Typically, Q is —$R^{11}$—C≡N, where $R^{11}$ can be any $R^1$ described above but is selected independently from $R^1$.

Most typically, the fluoropolymer is a terpolymer of TFE, $CF_2$=CY—R as described above, and $CF_2$=CY-Q as described above.

The polymer to be crosslinked may be made by any suitable method, including emulsion polymerization, extrusion polymerization, polymerization in supercritical carbon dioxide, solution or suspension polymerization, and the like. In one typical polymerization, $CF_2$=CF—O—$CF_2CF_2CF_2CF_2$—$SO_2F$ (MV4S) is preemulsified in water with an emulsifier (ammonium perfluorooctanoate, $C_7F_{15}COONH_4$) under high shear (24,000 rpm). An oxygen-free polymerization kettle equipped with an impeller agitator system is charged with deionized water and heated to 50° C. and then the preemulsion is charged into the polymerization kettle. The kettle is charged with a nitrile-functional monomer such as $CF_2$=CF—O—$C_5F_{10}$—C≡N, typically in a preemulsion. The kettle is further charged with gaseous tetrafluoroethylene (TFE) to 6-8 bar absolute reaction pressure. At 50° C. and 240 rpm agitator speed polymerization is initiated by addition of sodium disulfite and ammonium peroxodisulfate. During the course of the reaction, the reaction temperature is maintained at 50° C. Reaction pressure is maintained at 6-8 bar absolute by feeding additional TFE into the gas phase. A second portion of MV4S preemulsion may be continuously fed into the liquid phase during the course of the reaction. Additional nitrile-functional monomer may also be continuously fed into the reactor during the course of the reaction. After feeding sufficient TFE, the monomer feed may be interrupted and the continuing polymerization allowed to reduce the pressure of the monomer gas phase. The reactor may then be vented and flushed with nitrogen gas.

Typically, the polymer is formed into a membrane prior to crosslinking. Any suitable method of forming the membrane may be used. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed. Typically the membrane has a thickness of 90 microns or less, more typically 60 microns or less, and most typically 30 microns or less. A thinner membrane may provide less resistance to the passage of ions. In fuel cell use, this results in cooler operation and greater output of usable energy. Thinner membranes must be made of materials that maintain their structural integrity in use. In one typical process, membranes are cast by knife coating out of a water suspension containing 20% solids onto a glass plate and dried at 80° C. for 10 minutes to form films having a thickness of approximately 30 microns.

The step of crosslinking (nitrile trimerization) may be accomplished by any suitable method. Typically, crosslinking is accomplished by application of heat, typically to a temperature of 160° C. or more, in the presence of suitable initiators or catalysts. Suitable initiators or catalysts may include ammonia, ammonium compounds, including salts of ammonium and salts of quaternary ammonium compounds, including cyclic compounds such as salts of 1,8-diazabicyclo[5.4.0]undec-7-ene (DBU), including salts of fluorinated carboxylates, Lewis acids, and the like. The step of crosslinking the polymer may occur in whole or part during annealing of the membrane or may be carried out separate from any annealing step. During the crosslinking step, nitrile groups trimerize to form linkages comprising triazine groups, i.e., trivalent groups according to the formula:

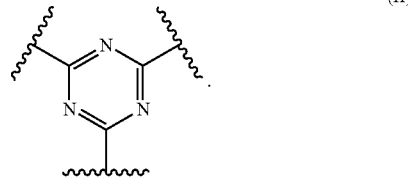

(II)

After crosslinking, the sulfur-containing functions of the first pendent groups may be converted to sulfonic acid form by any suitable process. Sulfonyl halide groups may be converted by hydrolysis. In one typical process, the polymer is immersed in an aqueous solution of a strong base and subsequently acidified. In one typical embodiment, a polymer membrane is immersed in 15% KOH in water at 80° C. for 1 hour, then washed twice in 20% nitric acid at 80° C., then boiled in deionized water twice.

The acid-functional pendent groups typically are present in an amount sufficient to result in an hydration product (HP) of greater than 15,000, more typically greater than 18,000, more typically greater than 22,000, and most typically greater than 25,000. In general, higher HP correlates with higher ionic conductance.

The acid-functional pendent groups typically are present in an amount sufficient to result in an equivalent weight (EW) of less than 1200, more typically less than 1100, and more typically less than 1000, and more typically less than 900.

In a further embodiment, the polymer may be imbibed into a porous supporting matrix prior to crosslinking, typically in the form of a thin membrane having a thickness of 90 microns or less, more typically 60 microns or less, and most typically 30 microns or less. Any suitable method of imbibing the polymer into the pores of the supporting matrix may be used, including overpressure, vacuum, wicking, immersion, and the like. The blend becomes embedded in the matrix upon crosslinking. Any suitable supporting matrix may be used. Typically the supporting matrix is electrically non-conductive. Typically, the supporting matrix is composed of a fluoropolymer, which is more typically perfluorinated. Typical matrices include porous polytetrafluoroethylene (PTFE), such as biaxially stretched PTFE webs.

It will be understood that polymers and membranes made according to the method of the present invention may differ in chemical structure from those made by other methods, in the structure of crosslinks, the placement of crosslinks, the placement of acid-functional groups, the presence or absence of crosslinks on pendent groups or of acid-functional groups on crosslinks, and the like.

This invention is useful in the manufacture of strengthened polymer electrolyte membranes for use in electrolytic cells such as fuel cells.

Various modifications and alterations of this invention will become apparent to those skilled in the art without departing from the scope and principles of this invention, and it should be understood that this invention is not to be unduly limited to the illustrative embodiments set forth hereinabove.

What is claimed is:

1. A polymer electrolyte membrane comprising a highly fluorinated polymer comprising: a perfluorinated backbone, first pendent groups which comprise sulfonic acid groups, and crosslinks comprising trivalent groups according to the formula:

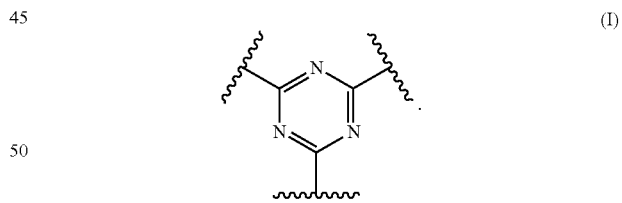

2. The polymer electrolyte membrane according to claim 1 wherein said first pendent groups are according to the formula: $-R^1-SO_3H$, where $R^1$ is a branched or unbranched perfluoroalkyl or perfluoroether group comprising 1-15 carbon atoms and 0-4 oxygen atoms.

3. The polymer electrolyte membrane according to claim 1 wherein said first pendent groups are according to the formula: $-O-CF_2-CF(CF_3)-O-CF_2-CF_2-SO_3H$.

4. A method of making a polymer electrolyte membrane comprising the steps of:
  a) providing a highly fluorinated polymer comprising: a perfluorinated backbone, first pendent groups which comprise sulfonyl halide groups, and second pendent groups which comprise nitrile groups;

b) forming said fluoropolymer into a membrane;
c) trimerizing said nitrile groups to form crosslinks; and
d) converting said sulfonyl halide groups to sulfonic acid groups.

5. The method according to claim 4 wherein said second pendent groups are selected from —C≡N and groups according to the formula: —$R^1$—C≡N, where $R^1$ is a branched or unbranched perfluoroalkyl or perfluoroether group comprising 1-15 carbon atoms and 0-4 oxygen atoms.

6. The method according to claim 4 wherein said first pendent groups are according to the formula: —$R^1$—$SO_2$X, where X is a halogen and where $R^1$ is a branched or unbranched perfluoroalkyl or perfluoroether group comprising 1-15 carbon atoms and 0-4 oxygen atoms.

7. The method according to claim 5 wherein said first pendent groups are according to the formula: —$R^1$—$SO_2$X, where X is a halogen and where $R^1$ is a branched or unbranched perfluoroalkyl or perfluoroether group comprising 1-15 carbon atoms and 0-4 oxygen atoms.

8. The method according to claim 6 wherein said first pendent groups are according to the formula: —O—$CF_2$—CF($CF_3$)—O—$CF_2$—$CF_2$—$SO_2$X.

9. The method according to claim 8 wherein said first pendent groups are according to the formula: —O—$CF_2$—CF($CF_3$)—O—$CF_2$—$CF_2$—$SO_2$X.

10. A polymer electrolyte membrane made according to the method of claim 4.

11. A polymer electrolyte membrane made according to the method of claim 5.

12. A polymer electrolyte membrane made according to the method of claim 6.

13. A polymer electrolyte membrane made according to the method of claim 7.

14. A polymer electrolyte membrane made according to the method of claim 8.

15. A polymer electrolyte membrane made according to the method of claim 9.

16. A polymer membrane comprising a highly fluorinated polymer comprising: a perfluorinated backbone, first pendent groups which comprise groups according to the formula —$SO_2$X, where X is F, Cl, Br, OH, or —$O^-M^+$, where $M^+$ is a monovalent cation, and crosslinks comprising trivalent groups according to the formula:

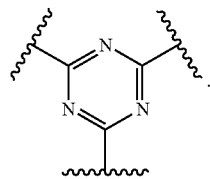

(I)

17. The polymer membrane according to claim 16 wherein said first pendent groups are according to the formula: —$R^1$—$SO_2$X, where $R^1$ is a branched or unbranched perfluoroalkyl or perfluoroether group comprising 1-15 carbon atoms and 0-4 oxygen atoms 18. The polymer membrane according to claim 16 wherein said first pendent groups are according to the formula: —O—$CF_2$—CF($CF_3$)—O—$CF_2$—$CF_2$—$SO_2$X.

19. A polymer comprising a highly fluorinated polymer comprising: a perfluorinated backbone, first pendent groups which comprise groups according to the formula —$SO_2$X, where X is F, Cl, Br, OH, or —$O^-M^+$, where $M^+$ is a monovalent cation, and crosslinks comprising trivalent groups according to the formula:

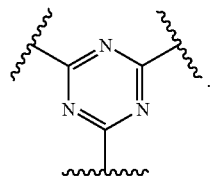

(I)

20. The polymer according to claim 19 wherein said first pendent groups are according to the formula: —$R^1$—$SO_2$X, where $R^1$ is a branched or unbranched perfluoroalkyl or perfluoroether group comprising 1-15 carbon atoms and 0-4 oxygen atoms.

21. The polymer according to claim 19 wherein said first pendent groups are according to the formula: —O—$CF_2$—CF($CF_3$)—O—$CF_2$—$CF_2$—$SO_2$X.

* * * * *